Sept. 27, 1966 J. HANDLEY 3,276,002
CARD STORAGE AND INFORMATION RETRIEVAL APPARATUS
Filed Oct. 4, 1960 17 Sheets-Sheet 1

Inventor
J. HANDLEY

By
Robert Harding Jr
Attorney

Sept. 27, 1966            J. HANDLEY            3,276,002
CARD STORAGE AND INFORMATION RETRIEVAL APPARATUS
Filed Oct. 4, 1960                                             17 Sheets-Sheet 2

*Inventor*
J. HANDLEY

By
*Robert T. Hawley*
Attorney

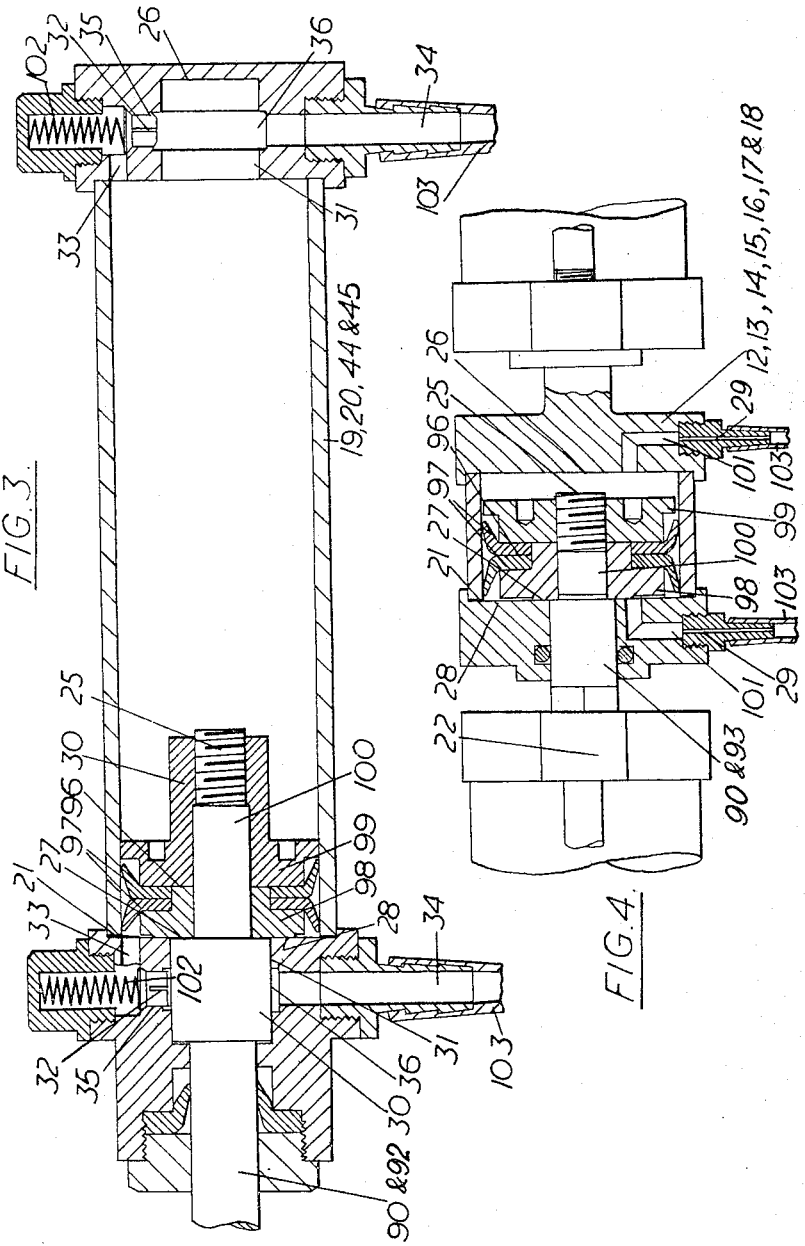

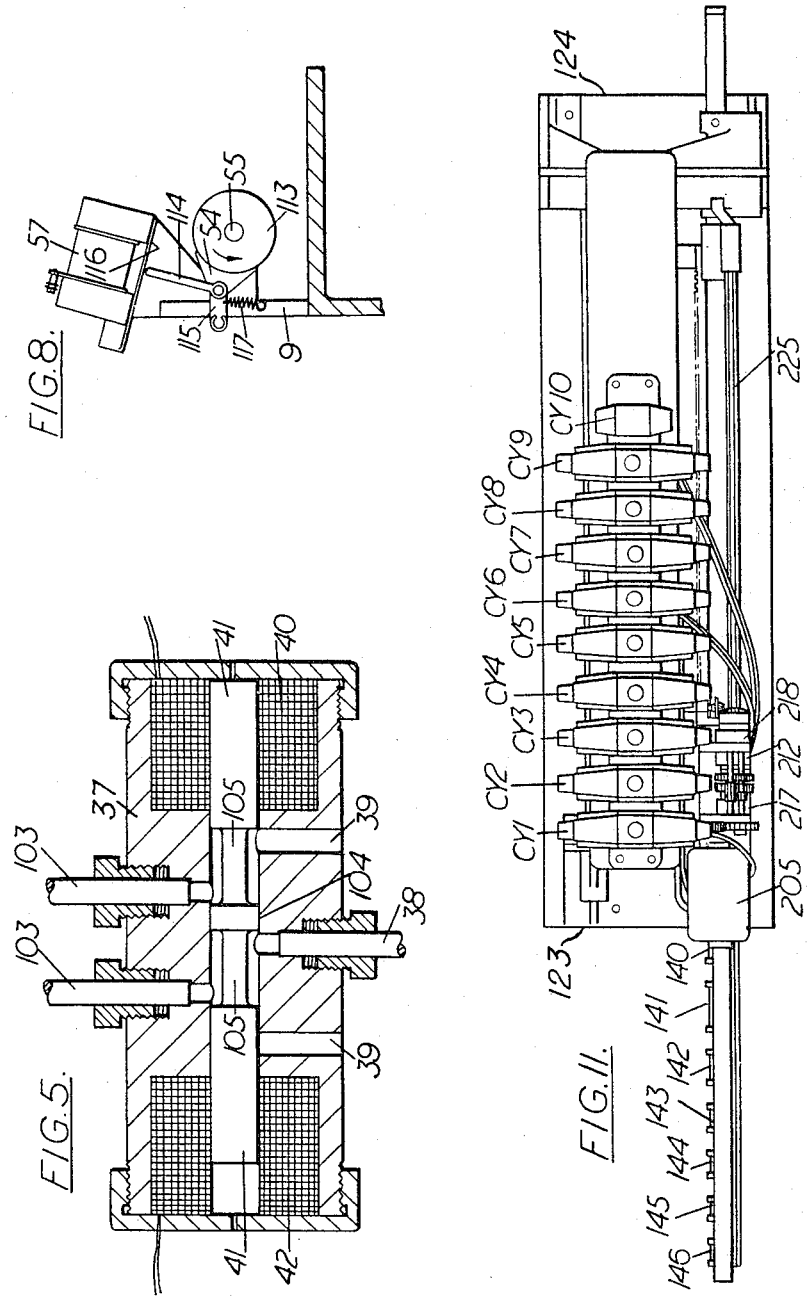

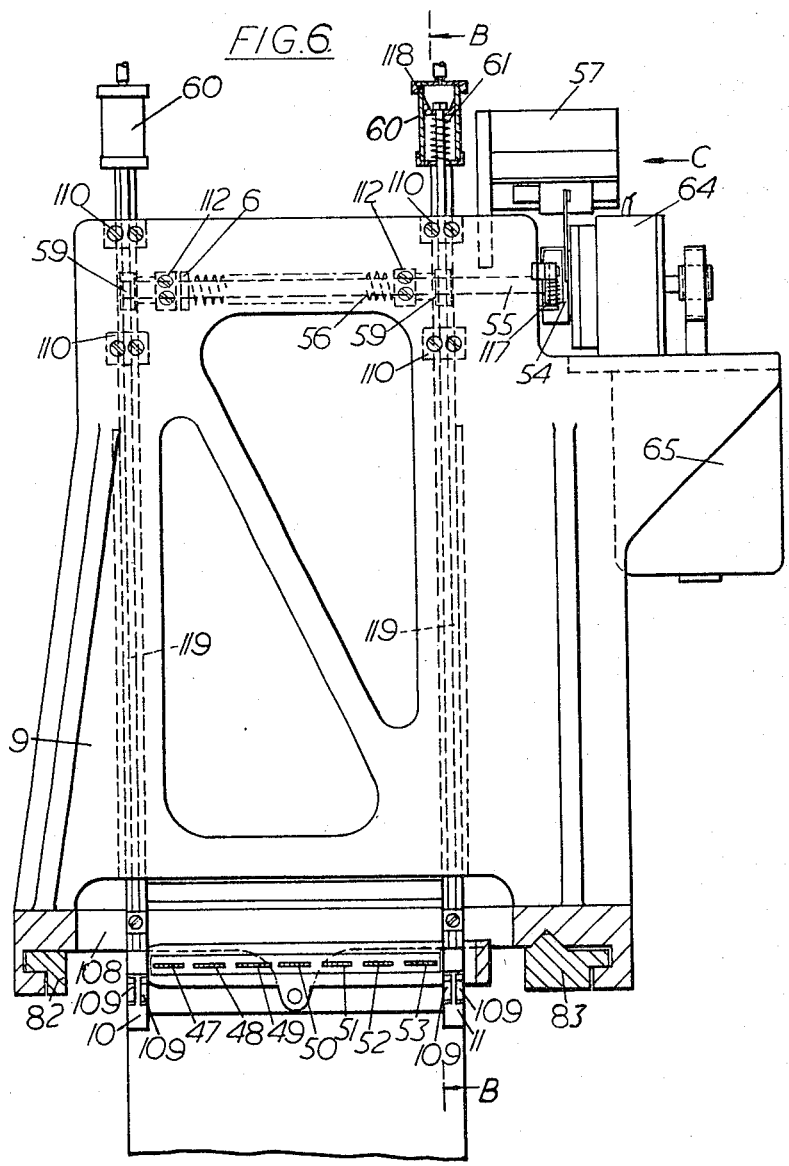

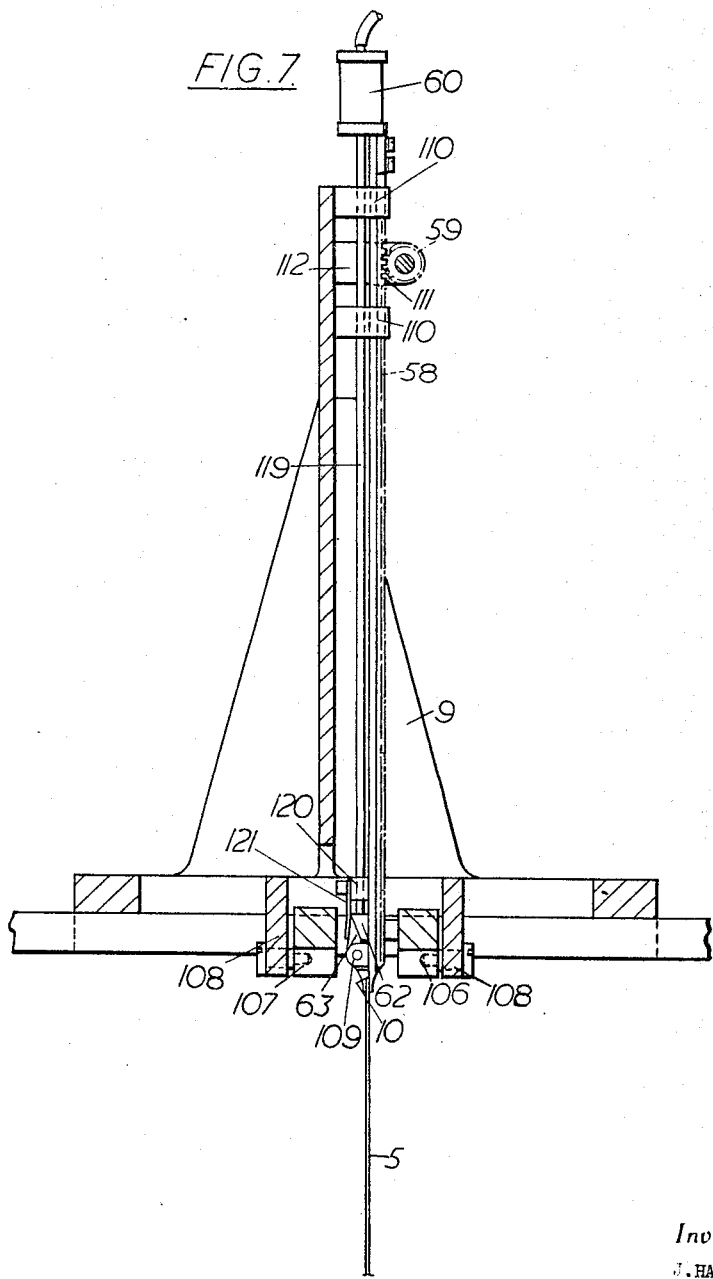

Sept. 27, 1966  J. HANDLEY  3,276,002
CARD STORAGE AND INFORMATION RETRIEVAL APPARATUS
Filed Oct. 4, 1960  17 Sheets-Sheet 7

FIG. 9.

Inventor
J. HANDLEY

By
Attorney

Sept. 27, 1966 J. HANDLEY 3,276,002
CARD STORAGE AND INFORMATION RETRIEVAL APPARATUS
Filed Oct. 4, 1960 17 Sheets-Sheet 8
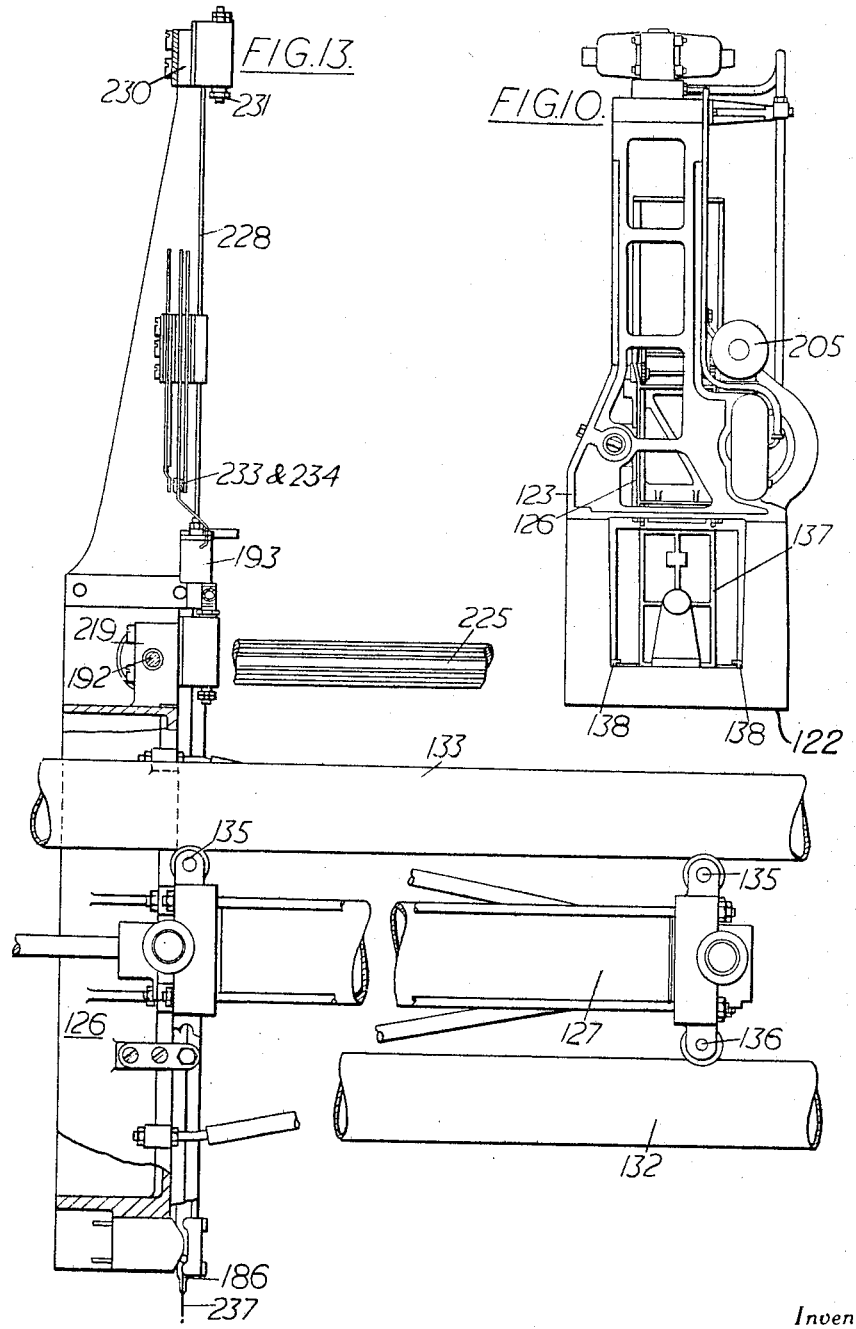
Inventor
J. HANDLEY
By
Robert Harding jr
Attorney Sept. 27, 1966  J. HANDLEY  3,276,002
CARD STORAGE AND INFORMATION RETRIEVAL APPARATUS
Filed Oct. 4, 1960  17 Sheets-Sheet 9

Inventor
J. HANDLEY

By
Robert F Harding Jr
Attorney

Sept. 27, 1966   J. HANDLEY   3,276,002
CARD STORAGE AND INFORMATION RETRIEVAL APPARATUS
Filed Oct. 4, 1960   17 Sheets-Sheet 10

Inventor
J. HANDLEY

By Robert Harding
Attorney

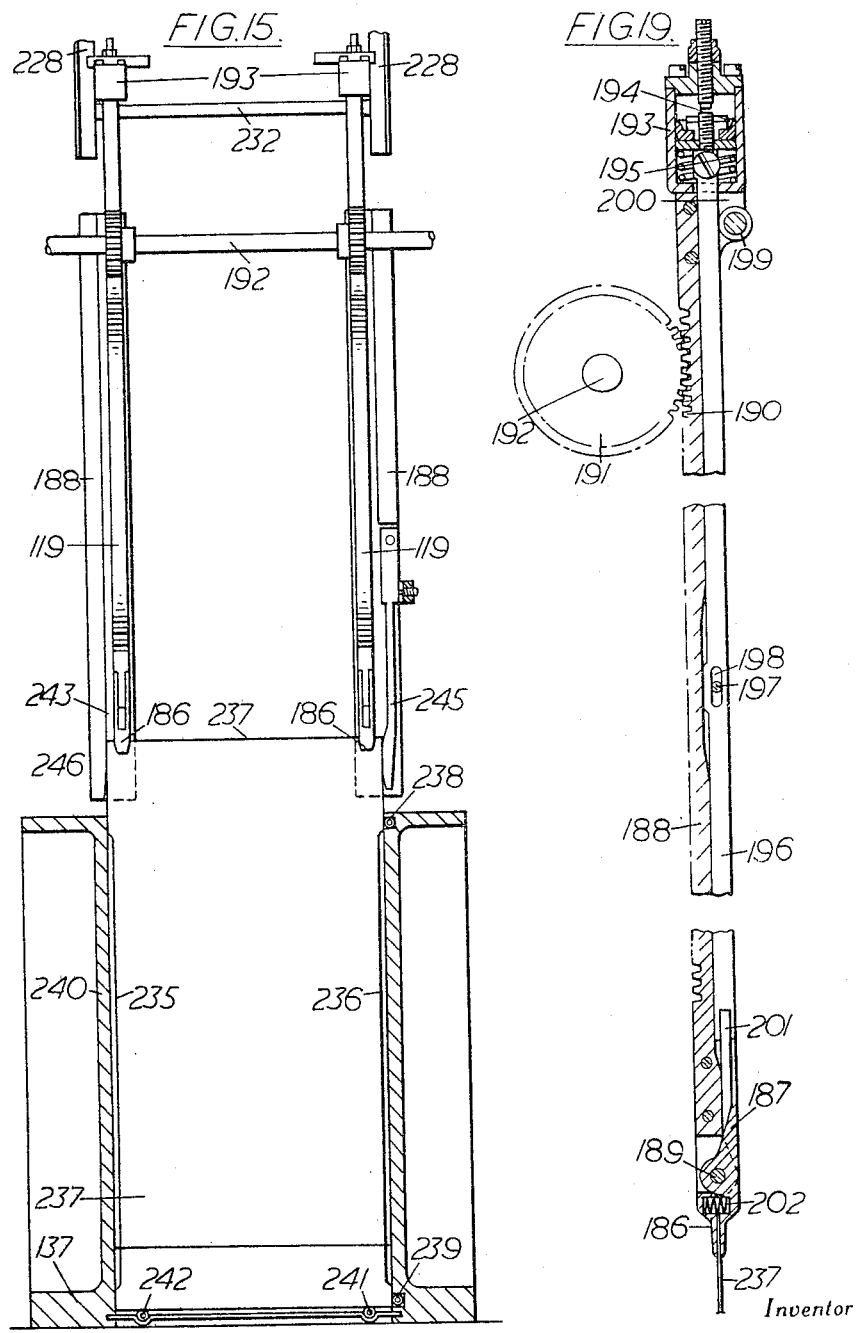

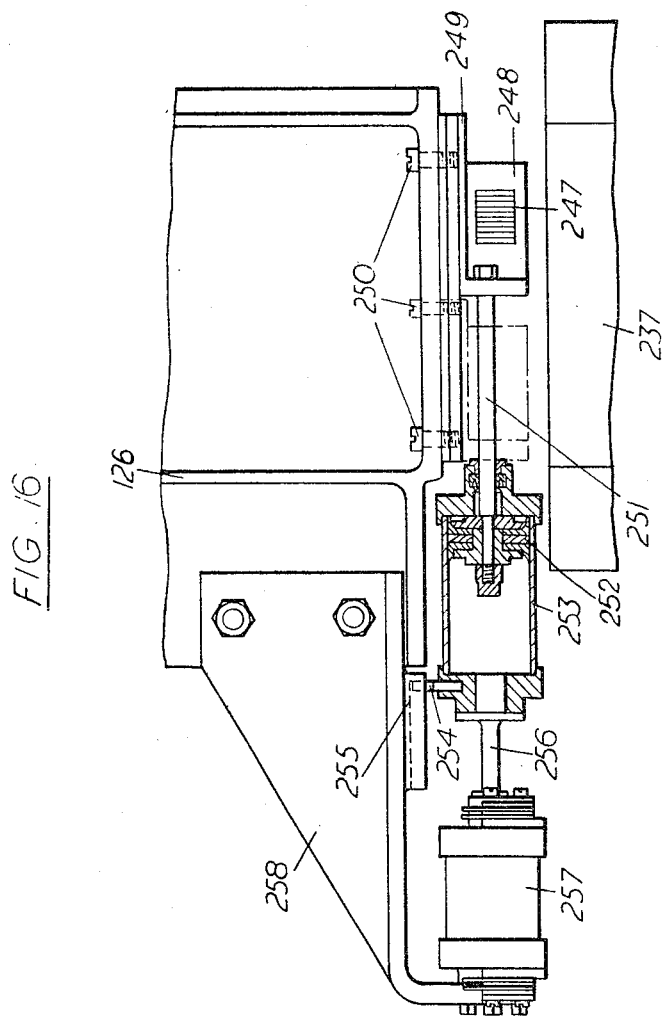

Sept. 27, 1966    J. HANDLEY    3,276,002
CARD STORAGE AND INFORMATION RETRIEVAL APPARATUS
Filed Oct. 4, 1960    17 Sheets-Sheet 13
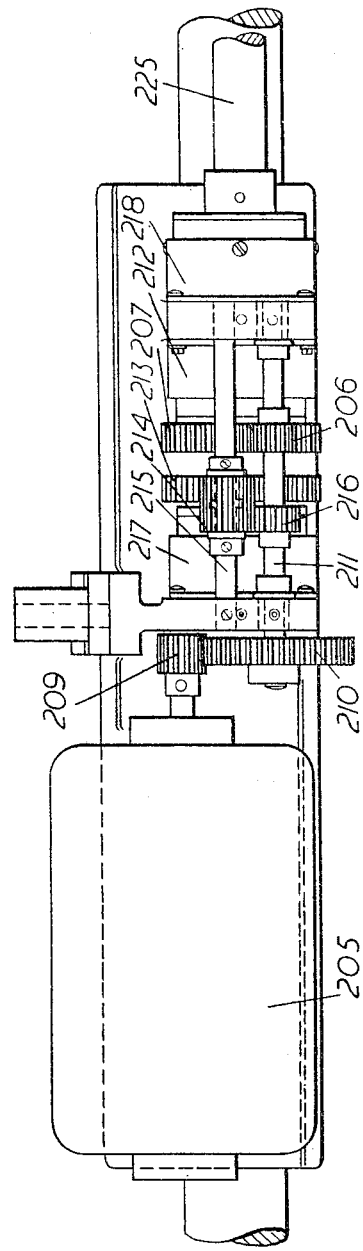
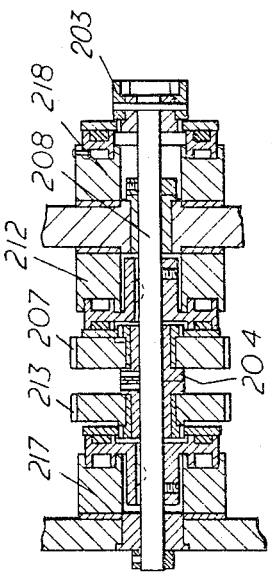
Inventor
J. HANDLEY
By
Attorney Sept. 27, 1966 J. HANDLEY 3,276,002
CARD STORAGE AND INFORMATION RETRIEVAL APPARATUS
Filed Oct. 4, 1960 17 Sheets-Sheet 15

Inventor
J. HANDLEY
By
Attorney

Inventor
J. HANDLEY

Sept. 27, 1966 J. HANDLEY 3,276,002
CARD STORAGE AND INFORMATION RETRIEVAL APPARATUS
Filed Oct. 4, 1960 17 Sheets-Sheet 17

Inventor
J. HANDLEY

By
Attorney

United States Patent Office 3,276,002
Patented Sept. 27, 1966

3,276,002
CARD STORAGE AND INFORMATION
RETRIEVAL APPARATUS
John Handley, Little Marland, Briar Hill, Purley,
Surrey, England
Filed Oct. 4, 1960, Ser. No. 60,395
4 Claims. (Cl. 340—174.1)

This invention relates to storage systems for use with computers and for data storage systems and it is particularly concerned with a method and apparatus for the storage, selection and transference from storage of any one of a number of information cards which are presented to a sensing device in, for example, a data storage system, such as a computer, high speed printing equipment, or the like.

The object of the invention is to provide a method and an apparatus which will facilitate the storage of a large amount of information on, for example, magnetic or punched information cards, and the quick selection and transference to a sensing device of any information card.

According to the present invention a method for the storage, selection, and movement in relation to a sensing device of information cards comprises storing at least one stack of said cards in spaced relation by guide means, positioning a combined head comprising a sensing device and card moving means in relation to a selected card in the said stack by relative movement between the said combined head and the said stack of cards, moving the said selected card across the sensing path of the said sensing device by the said card moving means without completely removing the said selected card from the said guide means and then returning the said selected card to the said stack by the said guide means.

According to the present invention an apparatus for the storage, selection, and movement, in relation to a sensing device, of information cards comprises means in which at least one stack of the information cards are stored in spaced relation by guide means, a combined head, comprising a sensing device and card moving means, mounted to move along the said stack of cards by relative movement therebetween, said card moving means having card gripping means capable of movement to and from the said stack of cards to draw a card across the sensing path of the said sensing device without completely removing the card from the said card guiding means.

If desired a number of stacks of information cards may be used which are moved by means to position the desired stack, from which a card is to be moved and placed before the sensing device, in the path of the said card moving means.

Preferably the means to move the combined head and/or means to position the desired stack of cards comprises fluid pressure operated cylinders enclosing pistons whose relative displacements are in geometrical progression, such that by selection and fluid pressurising, one or more of the said cylinders and pistons, the said combined head and/or the said means to position the desired stack of cards, are moved a distance equal to the summation of the said displacements of the cylinders relative to the pistons.

Preferably the information card moving means has fingers which are actuated by fluid pressure to grip the selected information card and move it past a sensing device actuating a data storage system, the movement of the selected information card being controlled by the said data storage system, and start and stop controls on the data storage system controlling the information card gripping and transporting means to synchronise its movements with the operation of the data storage system, for example, with such operations as carriage return, line feed and tabulating.

The geometrical progression used to determine the displacement of the fluid pressure operated cylinders and pistons which move the combined head preferably has a ratio of progression of two. The fluid medium which is used to operate the pistons may be a liquid, for example, oil, but we prefer to use a gas, air being most suitable.

The displacements of the fluid pressure operated cylinders and pistons are preferably graduated from a position in which the information card gripping and moving means is located above the end card of a stack when all of the cylinders and pistons are exhausted of fluid in one direction and pressurised in the other direction.

The invention is illustrated in the accompanying drawings, in which:

FIG. 3 is a plan view of the compressed air piston and cylinder 19 shown in FIG. 1 and is sectioned about the centreline;

FIG. 4 is a plan view of a compressed air piston and cylinder 13 shown in FIG. 1 and is sectioned about the centreline;

FIG. 5 is longitudinal sectional view of a double acting, solenoid operated air valve for controlling the flow of air to the cylinders;

FIG. 6 is a view taken in the direction of arrow A, FIG. 1, of the sensing device and magnetic card gripping and moving means;

FIG. 7 is a sectional view along line BB FIG. 6;

FIG. 8 is a view in the direction of arrow C, FIG. 6, of a clutch mechanism for raising or lowering the magnetic card gripping and moving means;

FIG. 9 is a side elevation of another embodiment of the present invention for a magnetic card system;

FIG. 10 is an end elevation of the embodiment shown in FIG. 9;

FIG. 11 is a plan view of the embodiment shown in FIG. 9;

FIG. 13 is a part side elevation showing the magnetic card lifting and scanning device of the embodiment shown in FIG. 9;

FIG. 15 is a part end elevation, similar to FIG. 14, showing the magnetic card partially lifted;

FIG. 16 is a part end elevation showing a traversing device for moving the sensing device of the embodiment shown in FIG. 9 across a magnetic card;

FIG. 17 is a part side elevation showing a magnetic card lifting and lowering device for the embodiment shown in FIG. 9;

FIG. 18 is a part view of FIG. 17 sectioned about the centreline of gears 62, 63 and 66;

FIG. 19 is a part side elevation showing a magnetic card gripping device for the embodiment shown in FIG. 9;

Figure 23:
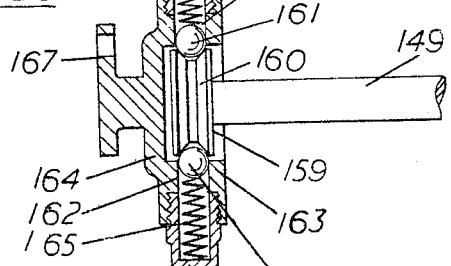
Figure 24:
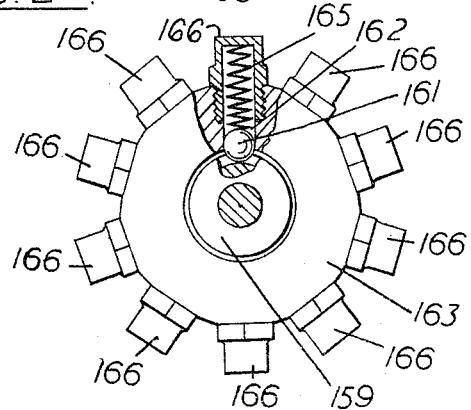

FIG. 23 is a side elevation of a shock absorbing device which may be fitted to any of the piston rods 149 attached to cylinders 127, 139, 140, 141, 142, 143 144, 145 and 146 of FIG. 9;

FIG. 24 is an end elevation of the shock absorbing device shown in FIG. 23; and

Figure 25:
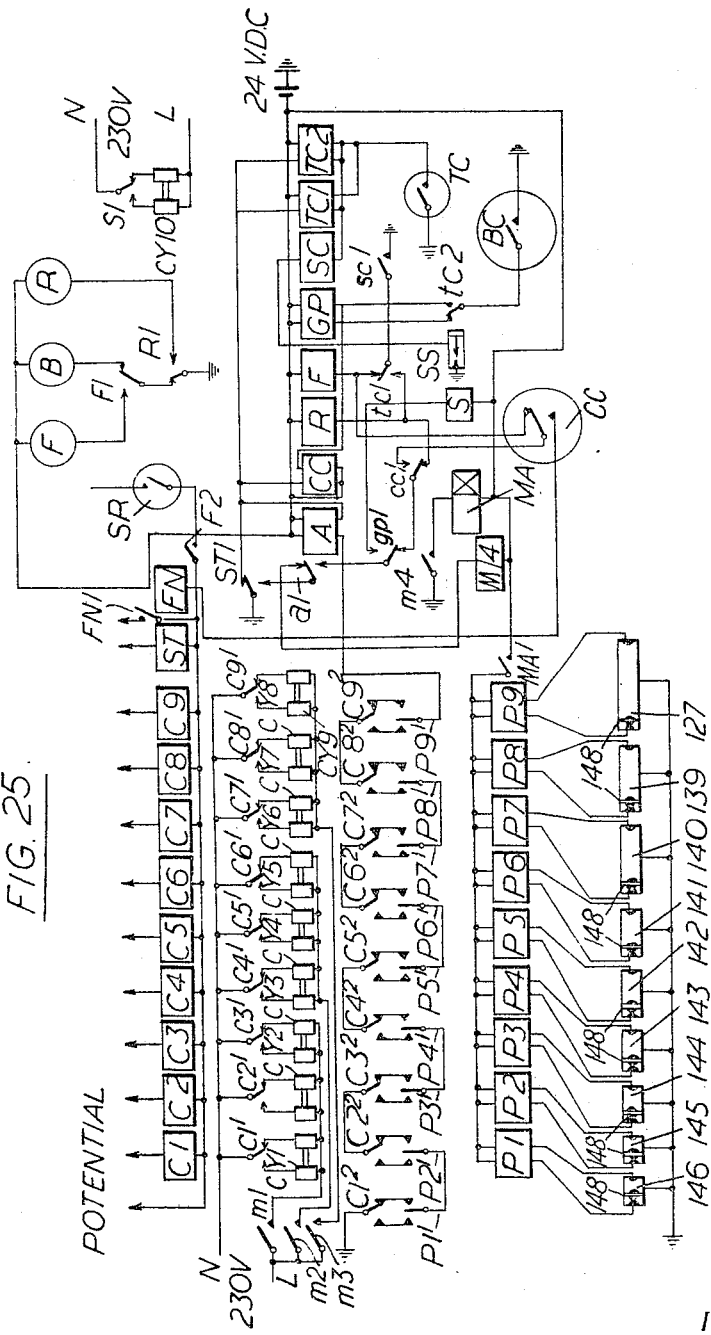

FIG. 25 is an electrical circuit diagram showing a control system for the embodiment shown in FIG. 9.

Figure 1:
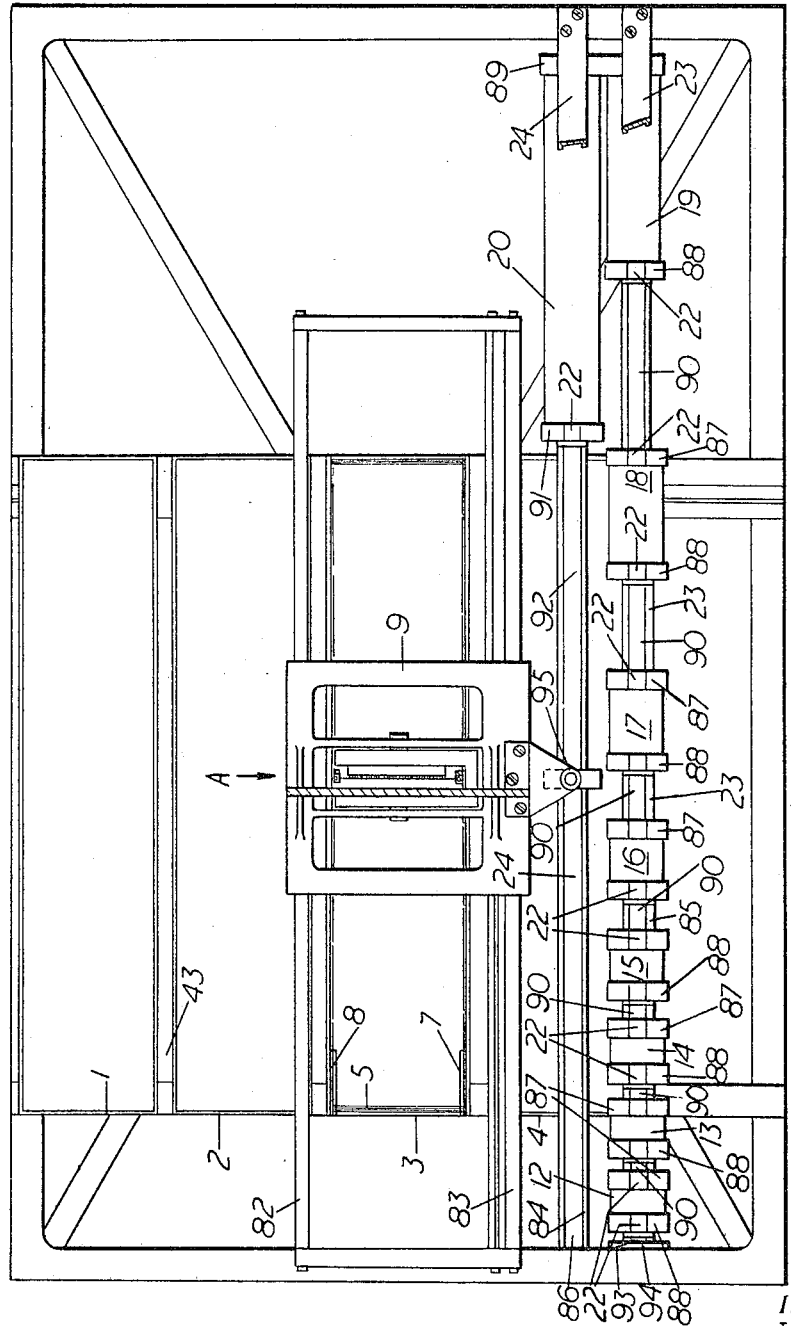
FIG. 1 is a plan view of one embodiment of the present invention for a magnetic card system and shows air pressure operated pistons which move a sensing device and magnetic card gripping and moving means.
Figure 2:
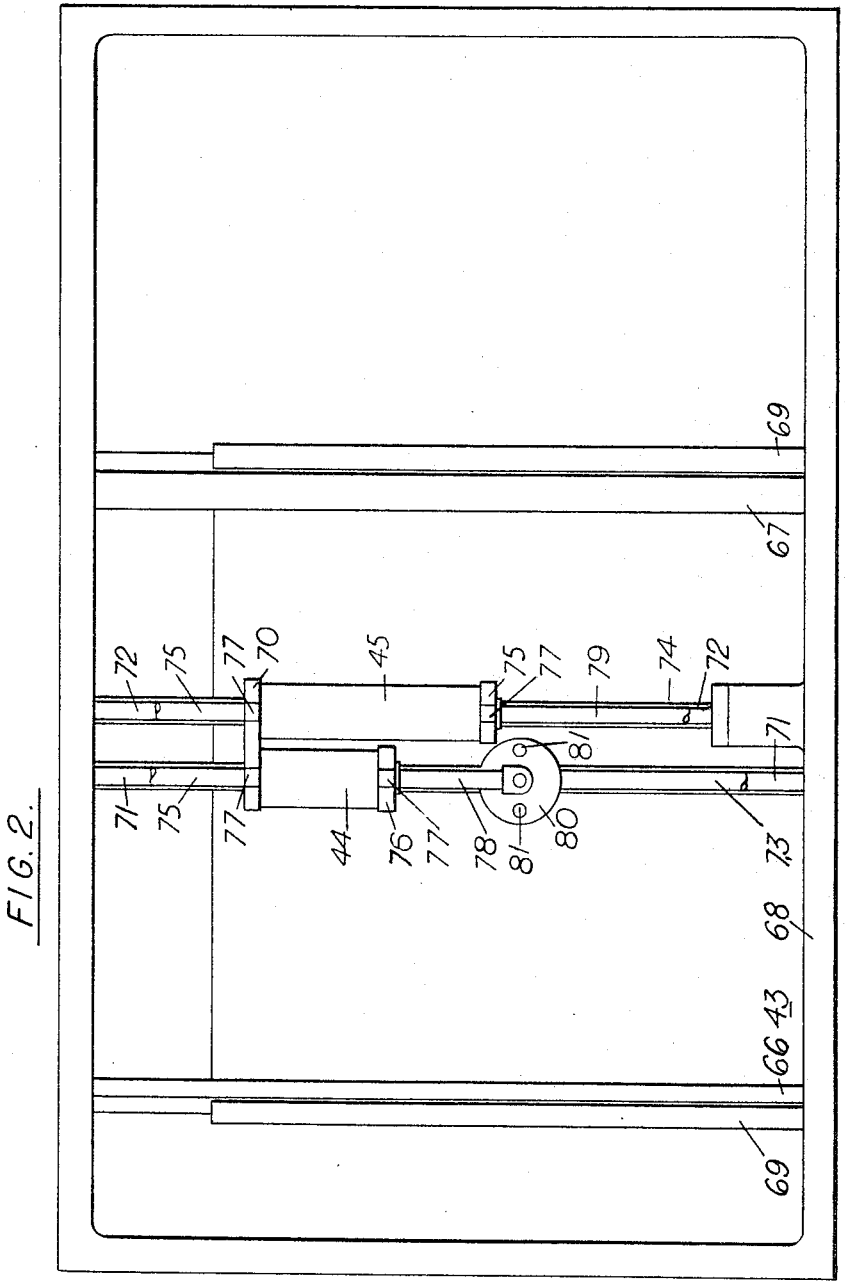
FIG. 2 is a view of the underside of the embodiment in FIG. 1 and shows air pressure operated pistons which move any one of a number of stacks of information cards.

Referring now to FIGS. 1 and 2 of the accompanying drawings cards 5 on which data are recorded magnetically are stacked in card boxes 1, 2, 3 and 4, the cards 5 being spaced at 0.04 inch pitch by slotted guides 7 and 8 which form the sides of the card boxes 1, 2, 3 and 4. The card boxes 1, 2, 3 and 4 are supported on a carrier plate 43 which is slidable on rails 66 and 67. These rails 66 and 67 are secured to the base 68 and the carrier plate 43 has flanges 69 which retain it on the rails 66 and 67. Cylinders 44 and 45 are joined by end flanges 70 and closed at their respective other ends by flanges 76 and 75, respectively, and are slidable between rails 71, 72, 73 and 74 (it will be noted that a portion of rails 71 and 72 has been removed on the drawing for clarity). The rails 71, 72, 73 and 74 are grooved at 75 and the flanges 70, 75 and 76 have lugs 77 located on the grooved portions 75 to retain the cylinders 44 and 45 between the rails 71, 72, 73 and 74.

The cylinders 44 and 45 contain pistons which will be described later with reference to the accompanying FIG. 3. These pistons are connected to rods 78 and 79. Rod 78 is secured to flange 80 which is grooved to slide along rail 73 and is bolted by bolts 81 to the carrier plate 43.

The base 68 has rails 82 and 83 mounted thereon (see FIG. 1), which slidably support a combined head frame 9. Cylinders 12, 13, 14, 15, 16, 17, 18, 19 and 20 contain pistons which will be described later with reference to FIGS. 3 and 4 of the accompanying drawings. The cylinders 12, 13, 14, 15, 16, 17, 18, 19 and 20 are slidable between guide rails 23, 24, 84, and 85. The guide rails 23, 24, 84 and 85 have grooves 86 and the cylinders 12, 13, 14, 15, 16, 17, 18, 19 and 20 have end flanges 87, 88 and 91 with lugs 22 which locate in the grooves 86.

The cylinders 19 and 20 have a common end flange 89, whilst the end flanges 88 and 81 are slidable along rods 90, 92 and 93 which are attached to the pistons within the cylinders 12, 13, 14, 15, 16, 17, 18, 19. End flanges 87 are secured to the ends of the rods 90. The rod 93 is attached by flange 94 to the base 68. The rod 92 is secured by bracket 95 to the slidable combined head frame 9.

Referring now to FIG. 3 which shows the cylinders 19, 20, 44 and 45 in detail and FIG. 4 which shows cylinders 12, 13, 14, 15, 16, 17 and 18 in detail, the pistons 96 have seals 97 secured between plates 98 and 99. The pistons 96 are mounted on the ends 100 of rods 90, 92 and 93 (see FIG. 1) and have end faces 25 protruding from the pistons 96, which form piston stops when they meet end faces 26. The pistons 96 have collars 27 which also form piston stops when they meet end face 28. The cylinders 12, 13, 144, 15, 16, 17 and 18, FIG. 4, have air inlet and outlet ports 101 fitted with air control jets 29 which slow down the pistons 96 at the end of their travel in the cylinders and thus provide a cushioning effect at the end of the stroke. The cylinders 19, 20, 44 and 45, FIG. 3, have air inlet and outlet ports 34. The pistons 96, FIG. 3, are provided with end portions 30 of reduced diameter. The end portions 30 are a sliding fit in bores 31 so that when the end portions 30 enter the bores 31 at the end of the strokes air is then exhausted through the hole 33 and jet valve 32 into the channel 36 to emerge from ports 34. The jet valve causes a cushioning effect at the end of the stroke. When air is passed under pressure into the ports 34 and into channel 36 to move the piston 96, the jet valve 36 is pressurised against the compression spring 102 which causes the jet valve 36 to rise, releasing air through the air port 35. Thus more air under pressure is allowed into the cylinders 19, 20, 44 and 45 until the end portions 30 enter the bores 31 so that for the most of their travel the pistons in the cylinders move quickly.

Each pair of the air inlet and outlet ports 101, FIG. 4, and 34, FIG. 3, is connected by air pipes 103 to a separate solenoid operated air valve 37 shown in FIG. 5. These solenoid operated air valves comprise coils 40 and 42 surrounding the ends of valves 41. The air inlet port 38 and air outlet ports 39 all communicate with bore 104. The valves 41 have two portions 105 of reduced diameter.

In the position shown in FIG. 5, the coil 40 is energized to pull the valve 41 into it so that air under pressure is passed from the air inlet port 38 to the left hand air pipe 103 (FIG. 5) whilst air from the right air pipe 103 is passed to the right hand air outlet port 39.

By energising coil 42 the valve 41 will be drawn to the left (FIG. 5) and then the air under pressure will be fed from the air inlet 38 to the right hand air pipe 103 whilst air is allowed to pass out of left hand air pipe 103 and out of the left hand air outlet port 39. By energising either of the coils 41 or 42 of any of the cylinders shown in FIGS. 1, 2, 3 or 4, that cylinder may be actuated in either direction.

Referring now to FIGS. 6, 7 and 8, the combined head frame 9 has seven multiple magnetic sensing devices 47, 48, 49, 50, 51, 52 and 53 of a known type mounted in block 106, if desired a further seven multiple magnetic sensing devices may be mounted in block 107. The block 106 and, if desired, block 107 are attached to the combined head frame 9 by brackets 108. Magnetic card lifting fingers 10 and 11 having wedges 63 are pivoted to lifting racks 58 by brackets 109. The lifting racks 58 are held in a slidable manner by brackets 110, and have a rack 111 in engagement with a pinion 59. The pinions 59 are keyed to shaft 55 which is rotatable in brackets 112, attached to the combined head frame 9. A compression spring 56 is compressed between brackets 112 and presses at one end against collar 6 which is keyed to shaft 55 to provide a smooth rotation to the shaft 55. The shaft 55 has brake 54 (FIG. 8) operating on a brake drum 113 which is keyed to the shaft 55. The brake 54 is pivoted to levers 114 and 115. 115 is attached to the sensing combined frame 9 by a pivot. The lever 114 is pivoted to a plate 116 which is held in spaced relation from an electromagnet 57 by a tension spring 117 secured to lever 115 at one end and the combined head frame 9 at the other end. The shaft 55 has an electromagnetic clutch 64 coupled to it and an electric motor 65 coupled to the electromagnetic clutch 64. Both the electromagnetic clutch 64 and the electric motor 65 are secured to the combined head frame 9.

Air cylinders 60 are attached to the upper end of the lifting racks 58 and contain pistons 118 attached to rods 119 and urged upwards by compression springs 61. The rods 119 are slidably held in brackets 110 and bracket 120. The lower ends of the rods 119 have wedges 62 secured to them and leaf springs 121 hold the wedges 63 against the wedges 62.

In operation the magnetic card lifting fingers 10 and 11 are normally held above the cards 5 by brake 54. With the lifting fingers in this position air under pressure is fed to the air inlet ports 38 of the solenoid operated air valves 37. A selected number of the coils 40 and 42 are energised to move the card boxes 1, 2, 3 and 4 so that the card box containing the selected card is moved under the line of traverse of the combined head frame 9 by means of cylinders 44 and 45. A further selected number of the coils 40 and 42 are then energised so that the cylinders 12, 13, 14, 15, 16, 17, 18, 19 and 20 move the combined head frame 9 to place the card lifting fingers 10 and 11 above the selected card 5. If desired the card boxes 1, 2, 3 and 4 and the combined head frame 9 may be moved at the same time.

With the lifting fingers 10 and 11 above the selected card 5, the electromagnet 57 (FIG. 7) is energised to release the brake 54, the electromagnetic clutch 64 is energised and the shaft 55 is rotated by the electric motor 65 so that the fingers 10 and 11 are lowered over the selected card 5 by the racks 111 and pinions 59. Air is then admitted to cylinders 60 to urge the pistons 118 downwardly so that rods 119 force the wedges 62 behind the wedges 63, this causes the fingers 10 and 11 to grip the card 5. Electromagnet 57 is then released, the magnetic clutch 64 is energised and the electric motor 65, which is synchronised with a printing machine, is started to rotate the shaft 55 in the direction which will raise the card 5, which is gripped by the fingers 10 and 11, from between the slotted guides 7 and 8.

As soon as the first character on the card 5 reaches one of the sensing heads 47, 48, 49, 50, 51, 52 or 53, a signal from the printing machine will disengage the electromagnetic clutch 64 and operate brake 54 by de-energising electromagnet 57. The printing machine will then proceed to scan the card 5 by means of the sensing heads 47, 48, 49, 50, 51, 52 and 53 and move the card 5 upwards at the desired intervals by operating the brake 54 by electromagnet 57 and electromagnetic clutch 64 until all of the information upon the card 5 has been scanned in this position the card 5 or an extension thereof still remains between the slotted guides 7 and 8. The brake 54 is then applied and the electromagnetic clutch 64 is released. The electric motor 65 is reversed and the electromagnetic clutch 64 is energised so that the brake 54 may be released by energising electromagnet 57. The electric motor will then lower the card 5 into its slotted guides 7 and 8. When the card is resting in the slotted guides 7 and 8 the electric motor 65 is switched off and the air under pressure to cylinders 60 is switched off so that compression springs 61 raise the rods 119 to remove the wedges 62 from behind wedges 63. The leaf spring 121 causes the fingers 10 and 11 to release the card 5. The electromagnetic clutch is then de-energised, the brake 54 is applied and the electric motor 65 is reversed so that by energising the electromagnetic clutch 64 after releasing the brake 54 the electric motor 65 raises the fingers 10 and 11 above the cards 5. The electromagnet 57 is de-energised to apply the brake 54 and the electric motor 65 is switched off. The combined head frame 9 is then ready to be moved in combination with the card boxes 1, 2, 3 and 4 above another card 5 which is to be scanned by the sensing heads 47, 48, 49, 50, 51, 52 and 53.

Referring now to FIGS. 9, 10 and 11, which show the general construction of the second embodiment of the present invention, the framework consists of a base 122, rear end casting 123, front end casting 124 and top member 125. The combined head frame 126, which is bolted at one side to the end 180 (FIGS. 20 and 21) of the long cylinder 127 and tied by stays 128, 129 and 130, shown in FIG. 12, travels along the guide rails 13, 132 and 133 by means of nylon rollers 134 on pins 135 and 136 which are mounted on bracket 185 on the left hand side (FIG. 12) of card lifting unit 126 and on the end of cylinder 127 on the right hand side. Pins 135 are concentric but pins 136 are eccentric and are adjustable by rotation to take up any wear of the nylon rollers 134 so that the path taken by the combined head frame 126, as nylon rollers 134 travel along guide rails 131, 132 and 133, may be adjusted to line up with the card box 137. The card box 137 may also be adjusted for correct alignment by adjustable guide rails 138.

Figure 20:
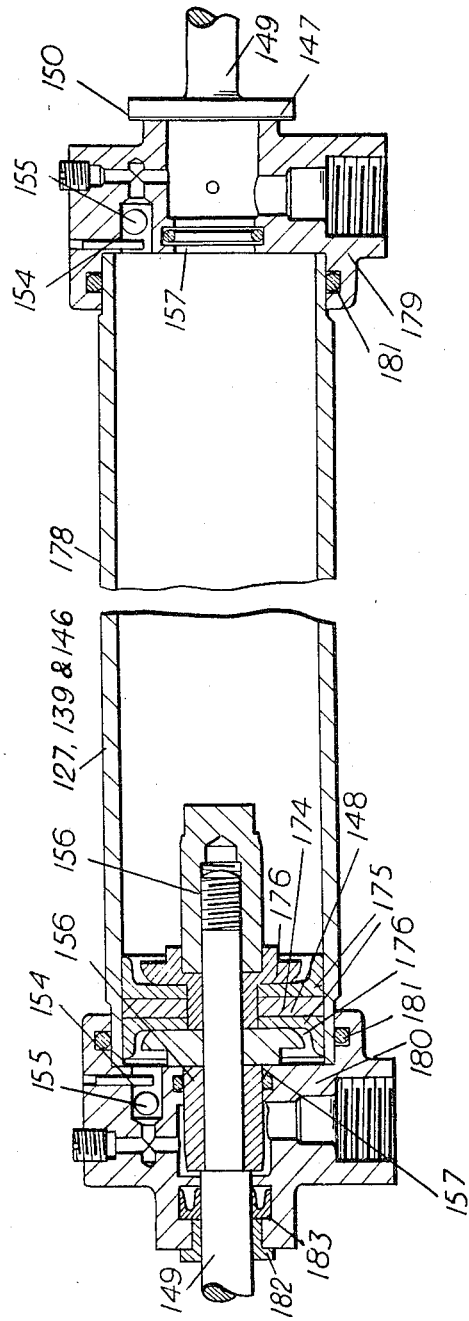
FIG. 20 is a sectional side elevation of air cylinders 127, 139 and 140 shown in FIG. 9.
Figure 21:
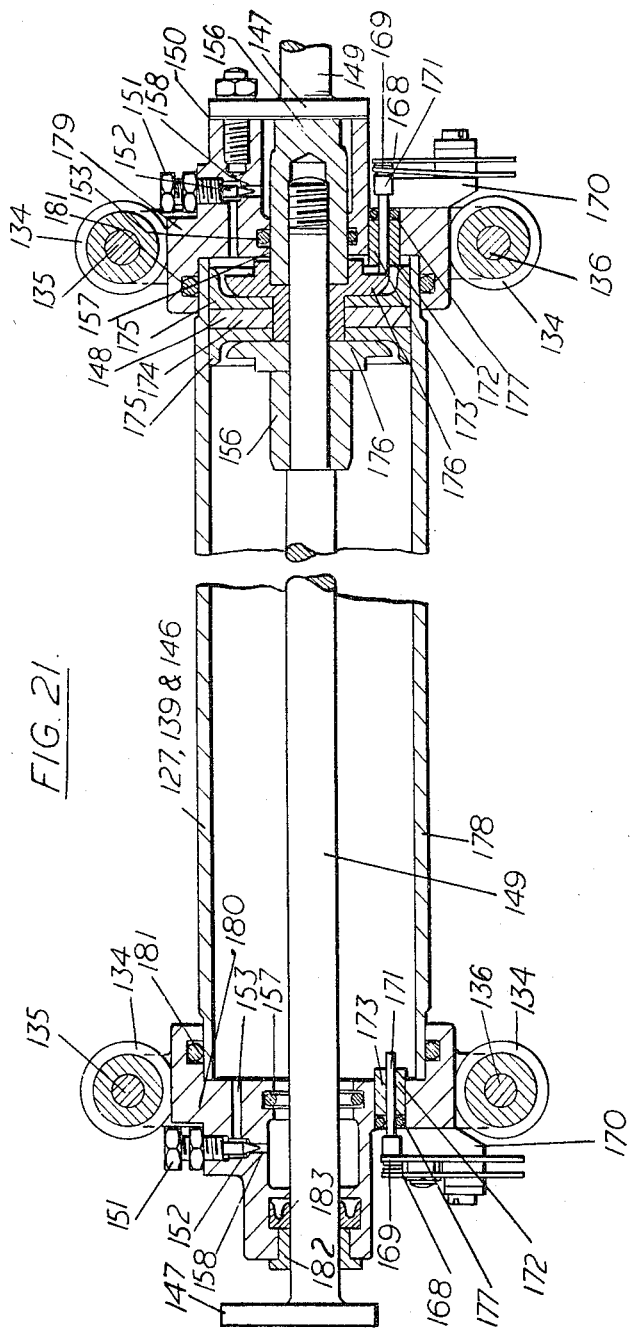
FIG. 21 is a sectional side elevation at 90° to FIG. 20 with the piston in a different position.
Figure 22:
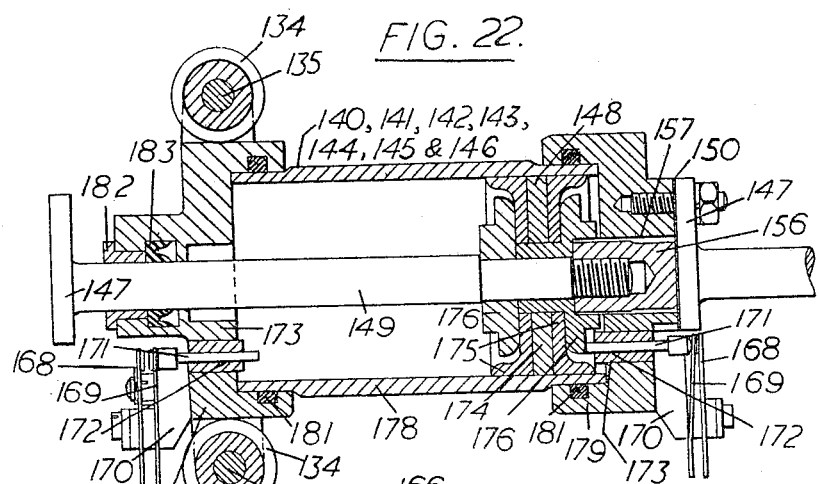
FIG. 22 is a side elevation of air cylinders 141, 142, 143, 144, 145 and 146, shown in FIG. 9.

Cylinders 127, 139, 140, 141, 142, 143, 144, 145 and 146 are connected in tandem in the same manner as the previous embodiment and each has an accurate stroke of twice or half the distance of the adjacent one to whose piston 148 it is connected by flange 147 and shaft 149, see FIGS. 20, 21 and 22. The electro-magnetic air valves CY1 to CY10 (FIG. 11) are of the same construction as those shown in FIG. 5. Valves CY1 to CY9 control the air flow to and from the cylinders in FIGS. 20, 21 and 22. Valve CY10 either passes air to operate card lifting fingers 186 (FIG. 12) or to air pipes 238, 239, 241 and 242 (FIG. 14), in a manner which will be described later.

The strokes of the cylinders are 12 inches on cylinder 127, 6 inches on cylinder 139, 3 inches on cylinder 140, 1½ inches on cylinder 141, ¾ of an inch on cylinder 142, ⅜ of an inch on cylinder 143, ³⁄₁₆ of an inch on cylinder 144, ³⁄₃₁ of an inch on cylinder 145 and ³⁄₆₄ of an inch on cylinder 146. By locating the combined head frame 126 over the extreme left hand card in card box 137 (FIG. 1) with all of the cylinders at the beginning of the stroke, that is, with all of them not extended, then by choosing the correct combination of cylinder strokes from one of them to the whole lot, the combined head frame 126, may be positioned over any other card of five hundred and twelve cards which are spaced at ³⁄₆₄ of an inch pitch in the card box 137.

Referring now to FIGS. 21, 22 and 23, when the sums of the lengths of strokes between the pistons 148 and the cylinders 127, 139, 140, 141, 142, 143, 144, 145 and 146 does not accurately locate the combined head frame 126 over any of the cards in card box 137, a shim 150 may be replaced by another one of different thickness to compensate for the error in the length of the stroke. The pistons 148 are composed of a neoprene seal 174, side plates 175 and flanges 176. The cylinders are composed of tubes 178 secured in ends 179 and 180 and sealed therein by seals 181. The shafts 149 are slidable in bushings 182 in ends 180 and are sealed by seals 183. The nylon rollers 134 are supported by pins 135 and 136 in the brackets 184.

The long cylinders 127, 139 and 146 in FIGS. 20 and 21 have air valves 151 in air inlet ports 152. Air is exhausted from one side of the pistons 148 by port 153 when air is passed under pressure through the inlet port 154 at the opposite end of the cylinder. The inlet ports 154 contain balls 155 which prevent air from being exhausted from these ports. The pistons 148 are provided with protruding end faces 156 which towards the end of a stroke enter bores 157 and push air through the ports 158. Air escaping from the ports 158 is restricted by the air valve 151 and thus a cushioning effect is provided at the ends of the strokes.

The cylinders in FIG. 22 are cushioned at the ends of the strokes by the reducing of the ends of the air pipes (not shown).

Referring now to a shock absorbing device, shown in FIGS. 23 and 24, which may be attached to any of the piston rods 149 to prevent damage should any of the cushioning devices cease to function properly, the ends of the piston rods 149 have an end flange 159 which contains an annular V groove 160. Ten steel balls 161 are located in radial grooves 162 in plates 163 and 164 and are held pressed in the annular V groove 160 by compression springs 165 and retaining caps 166. Flange 167 now secures the shaft 149 to the cylinders shown in FIGS. 20, 21 and 22 instead of flange 147. Any jar between the cylinders in FIGS. 20, 21 and 22 and the shaft 149 in FIG. 23 will cause the steel balls 161 to ride up one side of the V groove 160 and compress the compression springs 165 until the jarring force is balanced. Movement of the steel balls 161 up one side of the V groove 160 will produce relative movement between the cylinders in FIGS. 20, 21 and 22 and the shaft 149 in FIG. 23 which will cushion the jarring effect between these members.

Referring to FIGS. 21 and 22 spring electrical contacts 168 and 169 are attached to mounting block 170 to the cylinders. A pin 171 extends through bore 172 in a fluidtight and slidable manner to protrude into the cylinders. The bores 172 are contained in bushings 173 to provide the slidable surface which may also contain synthetic O ring seals 177.

Figure 12:
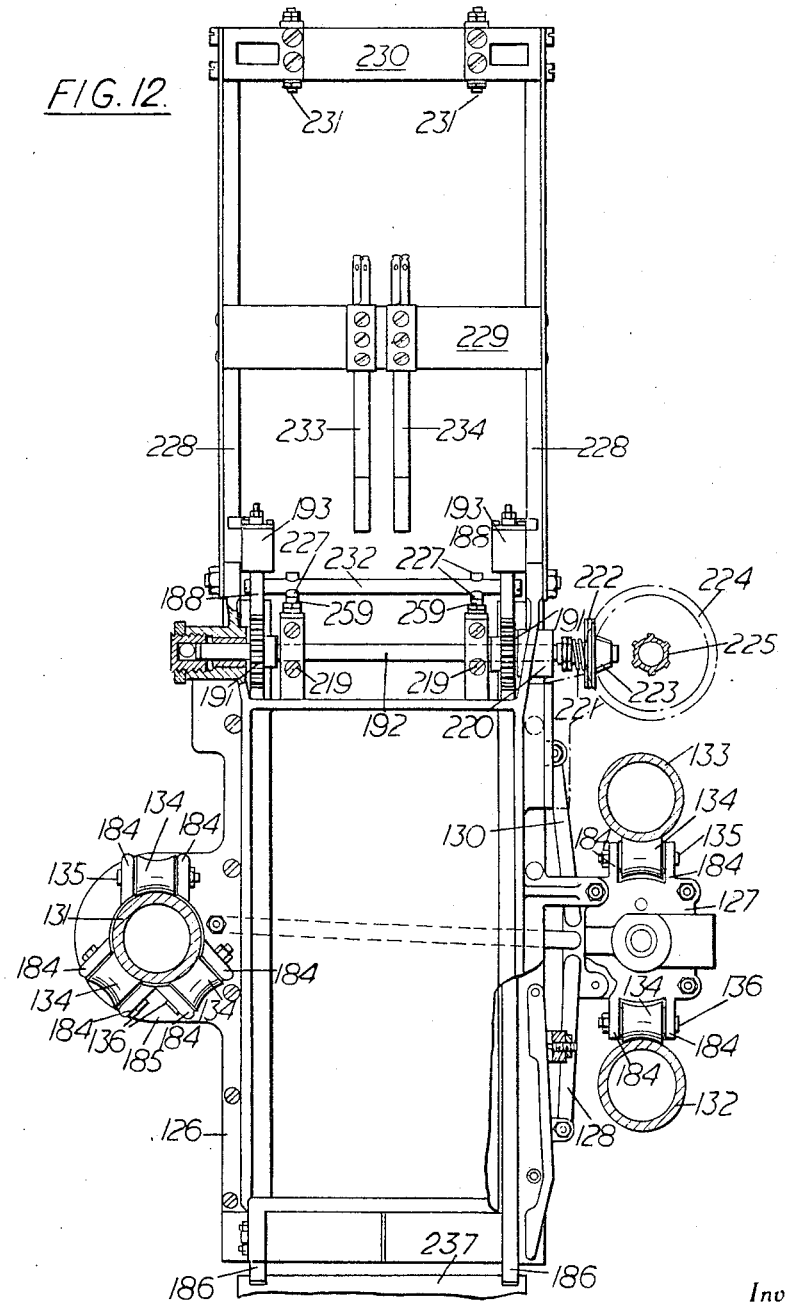
FIG. 12 is a part end elevation, sectioned along line AA of the magnetic card lifting and scanning device of the embodiment shown in FIG. 9.

It will be seen from FIG. 12 that the combined head frame 126 has two lifting fingers 186 in the form of forceps-like grippers which will now be described with reference to FIG. 19 which shows the card gripping means attached to them. It will be seen that the card gripping means are composed of card lifting fingers 186 having wedged 187 which are pivoted to lifting racks 188 by pins 189. The lifting racks 188 have racks 190 in engagement with pinions 191 keyed to shaft 192. Lifting rack air cylinders 193 which are controlled by electromagnetic valve CY10 (FIG. 11) are attached to the upper ends of the lifting racks 188 and contain pistons 194 attached to rods 196 and urged upwards by compression springs 195. The rods 196 are slidably attached to lifting racks 188 by pins 197 in slots 198 and guide rollers 199 on brackets 200 attached to the lifting racks 188. The lower ends of rods 196 have wedges 201 secured to them and compression springs 202 urge the wedges 187 against the wedges 201.

The shaft 192 (FIG. 12) is mounted in bearing stands 219 upon the combined head frame 126 and passes through bearing 220. A compression spring 221 holds a slipping clutch 222 against a bevel gear 223 on the shaft 192. The bevel gear 223 meshes with a bevel gear 224 which is keyed to splined shaft 225 and is slidable therealong.

The splined shaft 225 is connected by coupling 203 (FIGS. 17 and 18) to a driving unit composed of a gear unit 204 and an electric motor 205.

The electric motor 205 has a gear 209 meshing with a gear 210 on shaft 211. A gear 206 meshes with a gear 207 which is operated by electromagnetic clutch 212 on shaft 208 which in turn is coupled to shaft 192 by coupling 203. An electromagnetic clutch 217 is mounted upon shaft 208 and operates a gear 213 meshing with a gear 214 on shaft 215. The gear 214 meshes with a gear 216 on shaft 211. By actuating electromagnetic clutch 212 the shaft 192 is rotated through gears 206 and 207, and the card may be raised. By operating electromagnetic clutch 217, shaft 192 is rotated in the opposite direction through gears 216, 214 and 213. A brake 218, operated by an electromagnet, holds shafts 208, 225 and 192 stationary when necessary. The electric motor 205 and gear unit 204 are secured to the guide rail 133 (FIG. 9). The splined shaft 225 is supported at the end remote from the gear unit 204 by a bearing 226 which is also mounted upon the guide rail 133.

On the bearings 219 (FIGS. 12 and 13), are mounted electrical contacts 259 and on a cross bar 232 mounted on the lifting racks 188 are corresponding contacts 227 which bridge contacts 259 when the lifting racks 188 are lowered. The combined head frame 126 is extended upwards by angled section 228 which are joined by cross pieces 229 and 230. The cross piece 230 carries electrical contacts 231 which are in the vertical path of contacts 227. The cross piece 229 carries spring contacts 233 and 234 which will be deflected and bridged by the cross bar 232 when it is raised vertically (see FIG. 13).

Figure 14:
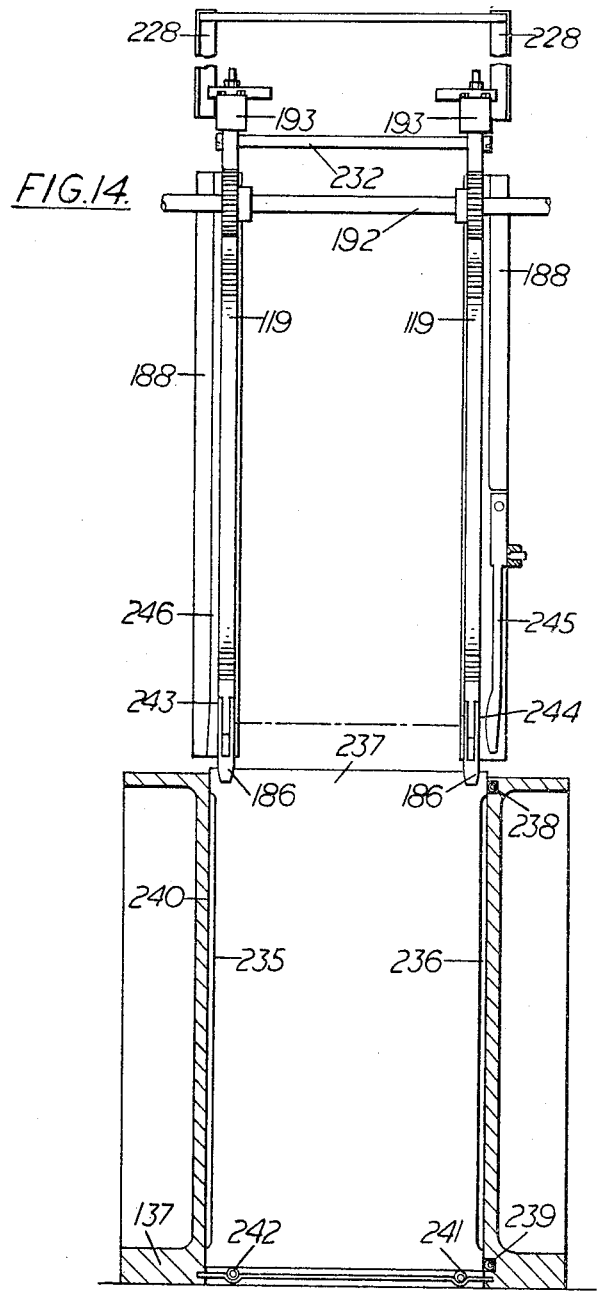
FIG. 14 is a part end elevation of the magnetic card lifting device showing the method of accurately positioning the magnetic card in relation to the scanning device of the embodiment shown in FIG. 9.

Referring now to FIGS. 14 and 15, the card box 137 has guides 235 and 236 which guide cards 237. Flexible tubes 238 and 239 can be pressurised with air by electromagnetic valve CY10, FIG. 11, to push the cards 237 against side face 240 of the card box 137 and thus ensure that the cards 237 are held vertically when a card is to be removed from the card box 137. Flexible tubes 241 and 242 may also be pressurised with air by electromagnetic valve CY10, FIG. 11, to provide a resilient stop for the cards 237 when a card is placed into the box 137.

The lifting fingers 186 slide in closely fitting guides 243 and 244 in lifting racks 188. A spring 245 is provided on the right hand lifting rack 188 (FIGS. 14 and 15) and a guide 246 is provided on the left hand lifting rack 188 so that when a card 237 is drawn upwards by lifting fingers 186 the spring 245 holds the card vertically by pressing it against the guide 246. The lifting fingers 186 are capable of limited sideways movement when a card is being raised for this purpose.

Referring now to FIG. 16, the sensing head 247 has ten magnetic heads and is attached to the combined head frame 126 by a bracket 248 which slides on a V guide rail 249. The guide rail 249 is attached to the card lifting frame 126 by screws 250. The bracket 248 is connected by rod 251 to the piston 252 within air cylinder 253. The air cylinder 253 is supported by bracket 254 which is slidable along guide rail 255. The cylinder 253 is connected by rod 256 to the piston within air cylinder 257. Air cylinder 257 is secured by bracket 258 to the combined head frame 126. It will be noted that the air cylinders 253 and 257 are of the same construction as those shown in FIG. 22. By admitting air under pressure to either or both of the air cylinders 253 and 257, the sensing head 247 may be moved from one card reading position to read the magnetic card 237 to three other positions to read the whole of a card. From this it will be seen that the ten magnetic heads being movable would have to be replaced by forty stationary magnetic heads.

The operation of the embodiment shown in FIGS. 9 to 25 will now be described with reference to FIG. 25 showing the electrical control circuit which is operated in conjunction with a computer. An input signal from, for example, a computer is fed to operate a combination of the relays C1 to C9 and ST relay. The relays C1 to C9 close the corresponding combination of contacts C1' to C9' which energise a combination of electromagnetic air valves CY1 to CY9. The ST relay closes a circuit through $a1$ from earth to relay M4.

The relays A, CC, GP, TC1, and TC2 are polarized relays each having two windings. With the ST1 contact in its normal position, as shown, one winding of each of these relays is energized, causing the relay to assume a normal condition with its contacts as shown. Each relay will remain in this condition until the other winding is energized when the contacts will shift.

The combination of the electromagnetic air valves CY1 to CY9 either admit air under pressure to or exhaust air from the air cylinders 127, 139, 140, 141, 142, 143, 144, 145 and 146, respectively, which move the combined head frame 126 to position the card lifting fingers 186 above a selected card 237. Whilst the combination of the air cylinders 127, 139, 140, 141, 142, 143, 144, 145 and 146 move the combined head frame 126, a slow-to-operate relay MA is energised over M4 and prepares for the operation of the centre stable relays P1 to P9 from the electrical contacts 168 and 169 (FIGS. 20, 21 and 22), which are closed at the end of the stroke of the air cylinders by the pistons 148. This prepares a series circuit via electrical contacts 168 and 169 when all of the cylinders have reached the end of their stroke.

When this series circuit is completed, relay A is energised over its other winding and earth is connected via ST1 (already operated), and contacts $a1$ to operate relay R which releases the brake B (218 FIGS. 17 and 18) and energises the reverse clutch R (217 on FIGS. 17 and 18). The electric motor, which is running throughout the sequence of operations, rotates the pinion 191 (FIG. 19) which lowers the lifting racks 188 (FIGS. 14, 15 and 19). When the lifting fingers 186 are in a position to grip the magnetic card 237 (FIG. 12) BC contacts (259 FIG. 12) are closed by cross bar 232 and GP relay is operated over its other winding.

GP relay operates contacts $gp1$ to take the earth off relay R and also to energise relay S. Relay R releases and releases the clutch R to reapply the brake B to stop the movement of the lifting fingers. Relay S operates contacts S1 to energise the electromagnetic air valve CY10 which will pressurize air cylinders 193 (FIG. 19) and cause the lifting fingers 186 to grip the magnetic card 237 by driving wedges 201 behind wedges 187.

With pressure in the cylinders 193, air operated switch SS (FIG. 25) is closed and energises relay SC. The relay SC closes contact SC1 which connects relay F to earth. Relay F operates the clutch F (212 on FIGS. 17 and 18) so that the pinion 191 lifts the card lifting racks 188 and the card lifting fingers 186 draws the card 237 out of the card box 137 (FIGS. 14 and 15). As the card lifting racks 188 rise with the card 237 held by the lifting fingers 186, the shaft 232 (FIG. 12) closes contact SR (234 FIG. 12) which send a signal to the computer indicating that the card is about to pass the reading head and reading will commence. The card 237 passes the magnetic head (247 FIG. 16) to the top of the travel of the card lifting racks 188 (FIGS. 12 and 13). When the card lifting racks 188 are in the top position, contacts TC (227 and 231) meet and energise relays TC1 and TC2 by means of their other windings.

Relay TC1 opens contacts tc1 to take the earth off relay F to release clutch F (212 FIGS. 17 and 18) and to energise the relay R which operates the clutch R (217 FIGS. 17 and 18) by operating contacts R1. Thus the clutch 212 is released and the clutch R (217) energised to lower the lifting racks 188 so that the card 237 is lowered into the card box 137 between the guides 235 and 236 (FIGS. 14 and 15). It should be noted that the cards 237 are not completely withdrawn from between the guides 235 and 236 when the card lifting racks 188 are in the raised position.

When the card is returned to the card box 137, contacts BC (259 FIG. 12) are closed again by the cross bar 232. Since the tc2 contacts are changed over, the closing of contacts BC operate relay CC over its other winding and restore GP to normal. The opening of contacts gp1 takes the earth off S and transfers it via contacts CC1 and contacts CC to relay F. R remains operative via tc1 and sc1.

Relay S now changes over the electromagnetic air valve CY10 which will exhaust the air from cylinder 193 (FIG. 19) and cause the lifting fingers 186 to release the magnetic card 237. Ss then breaks and restores Sc relay which takes the earth off relay R by opening contacts Sc1 and allows clutch F (212 in FIGS. 17 and 18) to operate, relay F relay being held over contacts st1, a1, gp1, cc1 and cc.

The card lifting fingers 186 are then raised by lifting racks 188 clear of the cards and contacts CC change, when shaft 232 (FIG. 12) urges the contacts 233 together, and operate relay FN to cancel the signal from the computer.

As contacts CC change, the earth is taken off relay F which releases and operates contact F1. The return to normal of contact F1 applies brake B (218 FIGS. 17 and 18).

Relay ST restores and this returns relays A, CC, TC1 and TC2 to normal.

When the valve CY10 is operated to shut off the air supply which pressurizes cylinders 193 (FIG. 19) it directs the air to pressurise pipes 238, 239, 241 and 242 (FIG. 14).

Whilst fluid pressure operated cylinders and pistons have been used in the embodiments of the present invention to move the sensing device, card gripping fingers, card lifting frame and card boxes, it is within the scope of the present invention to use any other known means, such as lead screws, instead of the fluid pressure operated cylinders and pistons.

Whilst the present invention has been described for use with a sensing device comprising a magnetic head, any other known type of sensing device may be used, such as, for example, light sensitive cells in conjunction with a light source or any known form of scanning means, such as, for example, the device known as a flying spot scanner.

I claim:
1. In an electro-mechanical storage apparatus where information is stored on relatively thin stiff cards stored side by side in spaced relation in containers of substantially the height of the cards disposed in parallel array with each card having a number of parallel tracks of information recorded thereon, said apparatus including a carriage mounted on guides for movement adjacent to said containers, extraction and return means mounted on the carriage for movement along a line intersecting the plane of a card in a container toward and away from the card, carriage power means connected to the carriage for moving the carriage across the edges of cards in a container, extraction and return power means connected to the extraction and return means for moving the latter, and track reading means mounted on the carriage and adjacent to a plane including said line, the improvement comprising: said extraction and return means including two pairs of forceps-like grippers spaced from each other a distance less than the width of a card along a line parallel thereto, means for closing said grippers into clamping engagement with a card after movement toward said card in the plane thereof, and control means connected to said power means to move said carriage to position the grippers in the plane of a single selected card only, to move said grippers from an open condition into gripping engagement with said selected card, to move the grippers in said plane away from the container thereby carrying only a portion of the card out of the container and past said reading means during which movement the card is read, and thereafter returning the card to stored position in the container, opening the grippers, and returning the grippers to normal position away from the card.

2. In an electro-mechanical storage apparatus according to claim 1, a gripper carrier bar for each pair of grippers movable axially in said carriage to perform said engagement, extraction and return cycle, and a forceps-operating rod mounted on each carrier bar and axially movable with respect thereto to control the opening and closing of the respective gripper.

3. Information storage equipment wherein information is stored on flat card-like storage members, with a plurality of such members disposed in each of a plurality of containers, each container being of substantially the height of each of the members and each member containing at least one processable track of information stored on it, said equipment comprising gripping means closable against the faces of any member after the member has been selected and the gripping means has been moved relatively to the containers and member to dispose the gripping means adjacent to the selected member, means for retracting the closed gripping means to extract only a portion of the selected member from its container for processing the information track thereon, the means for moving the gripping means relatively to the containers comprising a sequential array of variable length devices together with means for independently adjusting each of them to a predetermined different length, one end of the array being fixed and all said devices being connected together in alignment so that the position of the opposite end of the array varies with the relative adjustments of the devices, and means connecting said opposite end of the array to the gripping means.

4. Information storage equipment as claimed in claim 3 in which said array of variable length devices comprises a longitudinally aligned series of fluid pressure cylinders, pistons therein and rods projecting therefrom, each rod being connected to the next adjacent cylinder, the displacement of the piston at one end of the series being equal to the spacing between cards in the containers and the displacement of all of the remaining pistons being in geometrical progression having a ratio of progression of two, using the displacement of said named piston as the first term of the progression.

References Cited by the Examiner

UNITED STATES PATENTS

| | | | |
|---|---|---|---|
| 2,650,830 | 9/1953 | Potter | 340—174.1 |
| 2,814,440 | 11/1957 | McWhirter et al. | 235—61.114 |
| 2,902,329 | 9/1959 | Brink et al. | 340—174.1 |
| 2,910,669 | 10/1959 | Brand | 340—174.1 |
| 2,918,656 | 12/1959 | Nolde | 340—174.1 |
| 2,940,068 | 6/1960 | Stiefel | 340—174.1 |
| 3,034,712 | 5/1962 | Mead | 340—174.1 |
| 3,060,413 | 10/1962 | Parks | 340—174.1 |
| 3,107,346 | 10/1963 | Darwin et al. | 340—174.1 |
| 3,176,279 | 3/1965 | Lin | 340—174.1 |

BERNARD KONICK, *Primary Examiner.*

C. D. ANGEL, MALCOLM MORRISON, IRVING SRAGOW, *Examiners.*

H. E. WURST, R. M. JENNINGS, R. J. McCLOSKEY,
*Assistant Examiners*